(12) United States Patent
Togino

(10) Patent No.: US 6,282,008 B1
(45) Date of Patent: Aug. 28, 2001

(54) SCANNING OPTICAL SYSTEM

(75) Inventor: Takayoshi Togino, Koganei (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/541,027

(22) Filed: Mar. 31, 2000

(30) Foreign Application Priority Data

Dec. 20, 1999 (JP) .................................................. 11-361053

(51) Int. Cl.[7] .................................................. G02B 26/08
(52) U.S. Cl. ........................ 359/196; 359/208; 359/212; 359/214; 359/221; 359/223; 359/226
(58) Field of Search ................................... 359/196, 208, 359/212–215, 221, 222, 223, 226, 726, 727, 831, 833, 834, 837

(56) References Cited

U.S. PATENT DOCUMENTS 3,604,932 * 9/1971 Beach ..................................... 359/216
5,365,049 * 11/1994 Peng ...................................... 235/462

FOREIGN PATENT DOCUMENTS 11-84291   3/1999 (JP) .

* cited by examiner

Primary Examiner—James Phan
(74) Attorney, Agent, or Firm—Pillsbury Winthrop LLP

(57) ABSTRACT

A compact scanning optical system formed by combining a deflecting mirror and a reflecting optical system so that the central beam of the incident light beam and the central beam of the scanning light beam are approximately on a straight line or approximately parallel to each other. The scanning optical system includes an entrance-side reflecting optical system on which a light beam from a light source is incident, a deflecting mirror for reflecting and deflecting the light beam exiting from the entrance-side reflecting optical system, and an exit-side reflecting optical system on which the light beam reflected from the deflecting mirror is incident. When an axial principal ray is defined by a light ray emanating from the light source and passing through the center of the deflecting mirror that constitutes a stop of the optical system, the axis of rotation of the deflecting mirror is set approximately parallel to the axial principal ray entering the entrance-side reflecting optical system from the light source.

15 Claims, 11 Drawing Sheets

SCANNING OPTICAL SYSTEM

BACKGROUND OF THE INVENTION

The present invention relates to scanning optical systems and, more particularly, to a compact scanning optical system comprising a combination of a deflecting mirror and a reflecting optical system, which is suitable for various uses, e.g. information reading, information recording, and measurement.

Japanese Patent Application Unexamined Publication (KOKAI) No. 11-84291, which was proposed by the present applicant, discloses a scanning optical system comprising a combination of a reflecting optical system having a reflecting surface formed from a rotationally asymmetric surface having only one plane of symmetry, e.g. a free-form surface, and a deflecting mirror, e.g. a polygon mirror.

Japanese Patent Application Unexamined Publication (KOKAI) No. 10-123449, which was also proposed by the present applicant, discloses a compact scanning optical system of the type described above, which uses a deflecting mirror arranged in the form of a micro-mirror device by using semiconductor manufacturing technology.

Incidentally, it is desirable from the viewpoint of obtaining a compact scanning optical system, particularly a thin scanning optical system, to arrange the optical system so that the central beam of the incident light beam and the central beam of the scanning light beam are approximately on a straight line or approximately parallel to each other. However, such an arrangement has not yet been proposed in conventional scanning optical systems using a deflecting mirror, e.g. a galvanometer mirror or a polygon mirror.

SUMMARY OF THE INVENTION

In view of the above-described circumstances of the prior art, an object of the present invention is to provide a compact scanning optical system formed by combining a deflecting mirror and a reflecting optical system so that the central beam of the incident light beam and the central beam of the scanning light beam are approximately on a straight line or approximately parallel to each other.

To attain the above-described object, the present invention provides a scanning optical system including an entrance-side reflecting optical system on which a light beam from a light source is incident. The scanning optical system further includes a deflecting mirror for reflecting and deflecting the light beam exiting from the entrance-side reflecting optical system, and an exit-side reflecting optical system on which the light beam reflected from the deflecting mirror is incident. When an axial principal ray is defined by a light ray emanating from the light source and passing through the center of the deflecting mirror that constitutes a stop of the optical system, the axis of rotation of the deflecting mirror is set approximately parallel to the axial principal ray entering the entrance-side reflecting optical system from the light source.

In this case, it is desirable to arrange the optical system so that the axial principal ray entering the entrance-side reflecting optical system from the light source and the axial principal ray exiting from the exit-side reflecting optical system are approximately parallel to each other at some position in the range of rotation of the deflecting mirror.

It is also desirable to arrange the optical system so that the deflected light beam exiting from the exit-side reflecting optical system converges on a surface to be scanned.

In the present invention, the axis of rotation of the deflecting mirror is set approximately parallel to the axial principal ray entering the entrance-side reflecting optical system from the light source. Therefore, the scanning optical system can be constructed in a compact form. The scanning optical system can be constructed in an even more compact form by arranging the scanning optical system so that the axial principal ray entering the entrance-side reflecting optical system from the light source and the axial principal ray exiting from the exit-side reflecting optical system are approximately parallel to each other.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention be indicated in the claims.

DESCRIPTION OF THE PREFERRED EMBODIMENTS

The scanning optical system according to the present invention will be described below by way of examples.

Figure 1:
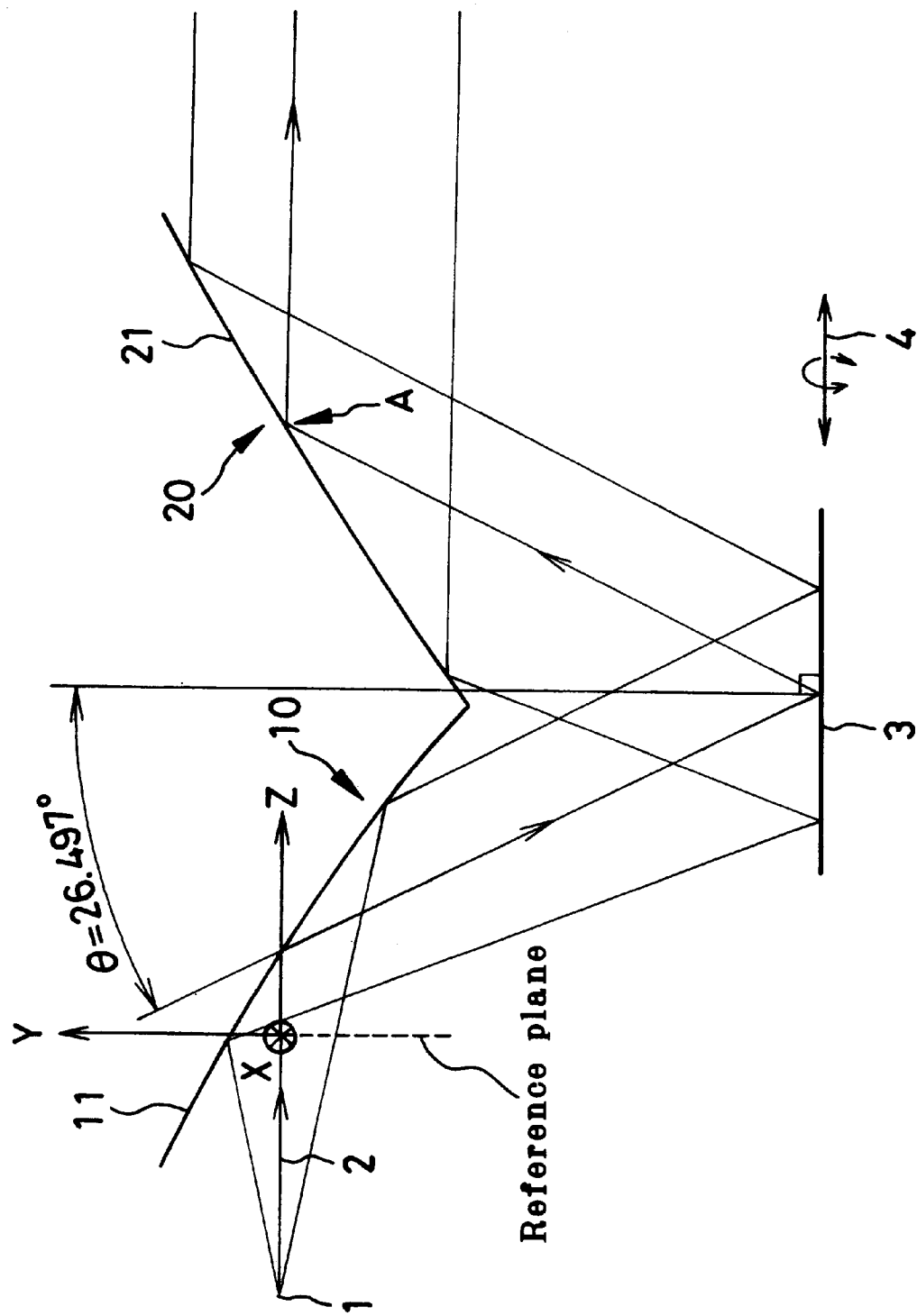
FIG. 1 is a sectional view showing the arrangement of a scanning optical system according to Example 1 of the present invention.

FIG. 1 is a sectional view showing the arrangement of a scanning optical system according to Example 1 of the present invention in a state where a deflecting mirror 3 is positioned at the center of the angle of deflection. This scanning optical system includes a light source 1, a deflecting mirror 3, a reflecting optical system 10 on the entrance side of the deflecting mirror 3, and a reflecting optical system 20 on the exit side of the deflecting mirror 3. When an axial principal ray 2 is defined by a light ray emanating from the light source 1 and passing through the center of the deflecting mirror 3 that constitutes a stop of the optical system, the axis 4 of rotation of the deflecting mirror 3 is set parallel to the axial principal ray 2 incident on the reflecting optical system 10, which is on the entrance side of the deflecting mirror 3, from the light source 1. In this example, the reflecting optical system 10 is formed from a single decentered curved reflecting surface 11, and the reflecting optical system 20 is also formed from a single decentered curved reflecting surface 21.

Figure 2:
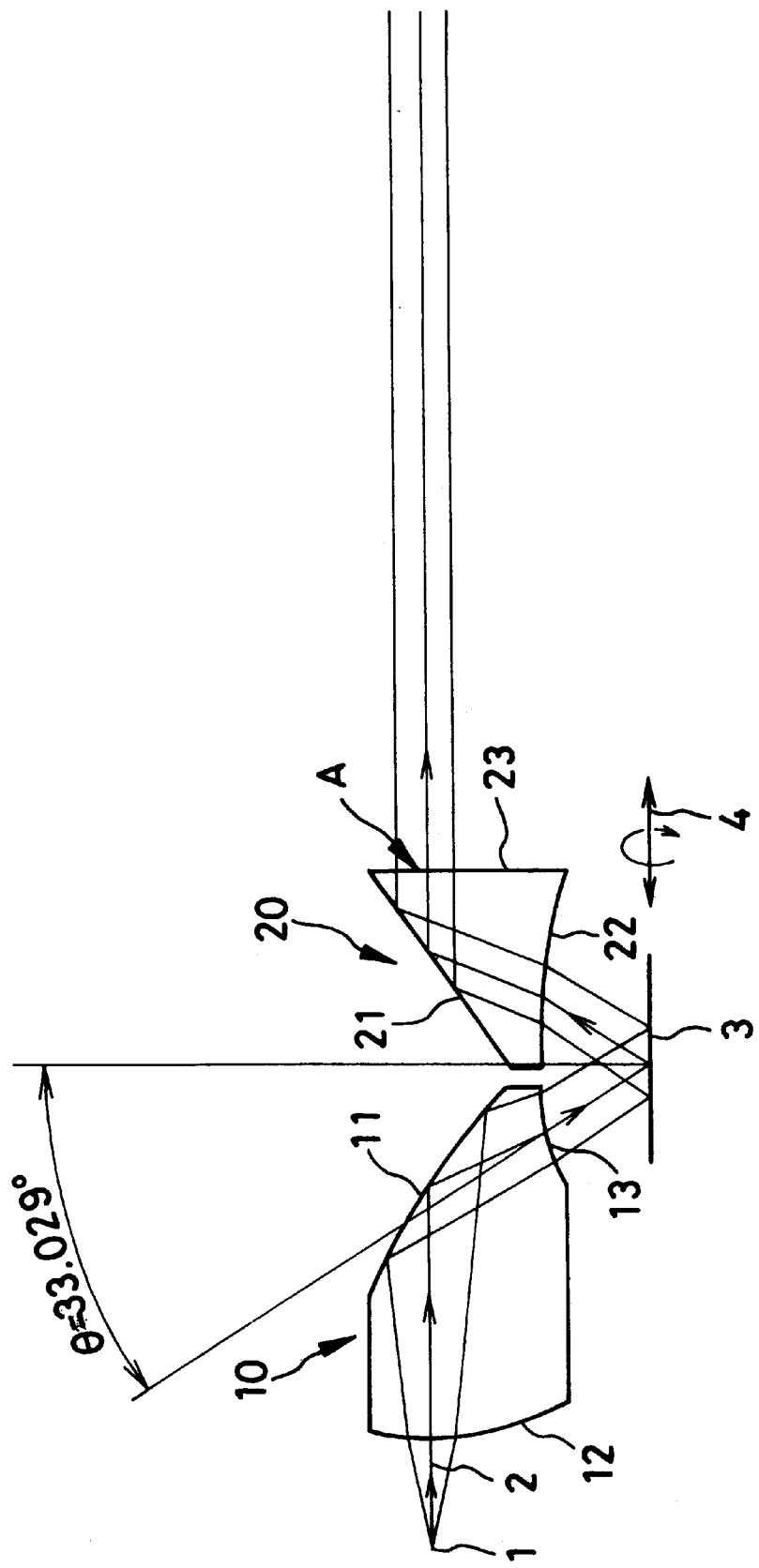
FIG. 2 is a sectional view showing the arrangement of a scanning optical system according to Example 2 of the present invention.

Here, let us set a coordinate system for the convenience of the following description. As shown in FIG. 1, the axial principal ray 2 is defined by a light ray emanating from the center of the light source 1 and passing through the center of the deflecting mirror 3 that constitutes a stop. A reference plane perpendicular to the axial principal ray 2 is set on the entrance side of the reflecting optical system 10. The intersection between the reference plane and the axial principal ray 2 is defined as the origin of a decentered optical surface. The direction along the axial principal ray 2 is defined as a positive direction of a Z-axis. A plane containing the axial principal ray 2 incident on the reflecting optical system 10 and the axial principal ray 2 exiting from the reflecting optical system 10 is defined as a YZ-plane. An axis passing through the origin and perpendicularly intersecting the YZ-plane is defined as an X-axis. The direction in which the X-axis extends from the obverse side to the reverse side of the plane of the figure is defined as a positive direction of the X-axis. An axis that constitutes a right-handed orthogonal coordinate system in combination with the X- and Z-axes is defined as a Y-axis. In FIG. 2 and the following figures, an illustration of the reference plane and the coordinate system is omitted.

In the arrangement as shown in FIG. 1, a light beam from the light source 1 is reflected by the curved reflecting surface 11 of the reflecting optical system 10 toward the deflecting mirror 3 and incident on the deflecting mirror 3 so that the incident angle of the axial principal ray 2 is θ. The light beam reflected by the deflecting mirror 3 is then reflected to travel in the Z-axis direction by the curved reflecting surface 21 of the reflecting optical system 20. The reflected light beam reaches a surface to be scanned at a finite position in the Z-axis direction and converges on the surface. With this arrangement, when the deflecting mirror 3 is oscillated about the axis 4 of rotation, which is parallel to the Z-axis, the light beam reflected from the curved reflecting surface 21 scans the surface to be scanned in the X-axis direction.

FIG. 2 is a sectional view showing the arrangement of a scanning optical system according to Example 2. In this example, the entrance-side reflecting optical system 10 in Example 1 is formed from a decentered prism optical system having a curved reflecting surface 11, and the exit-side reflecting optical system 20 in Example 1 is also formed from a decentered prism optical system having a curved reflecting surface 21. The axis 4 of rotation of the deflecting mirror 3 is set parallel to the axial principal ray 2 entering the reflecting optical system 10, which is on the entrance side of the deflecting mirror 3, from the light source 1 as in the case of Example 1.

In this example, the decentered prism optical system 10, which constitutes the entrance-side reflecting optical system, is a prism having an entrance refracting surface 12, a reflecting surface 11, and an exit refracting surface 13. The decentered prism optical system 20, which constitutes the exit-side reflecting optical system, is also a prism having an entrance refracting surface 22, a reflecting surface 21, and an exit refracting surface 23.

In the arrangement as shown in FIG. 2, a light beam from the light source 1 enters the entrance-side prism through the entrance refracting surface 12 of the decentered prism optical system 10, which constitutes the entrance-side reflecting optical system. The incident light beam is reflected by the curved reflecting surface 11 toward the deflecting mirror 3. The reflected light beam exits from the prism through the exit refracting surface 13 and is incident on the deflecting mirror 3 so that the incident angle of the axial principal ray 2 is θ. The light beam reflected by the deflecting mirror 3 enters the exit-side prism through the entrance refracting surface 22 of the decentered prism optical system 20, which constitutes the exit-side reflecting optical system 20. The incident light beam is reflected to travel in the Z-axis direction by the curved reflecting surface 21. The reflected light beam exits from the prism through the exit refracting surface 23 and travels in the Z-axis direction. Then, the light beam reaches a surface to be scanned at a finite position in the Z-axis direction and converges on the surface. With this arrangement, when the deflecting mirror 3 is oscillated about the axis 4 of rotation, which is parallel to the Z-axis, the light beam reflected and refracted by the exit-side reflecting optical system 20 scans the surface to be scanned in the X-axis direction.

Figure 3:
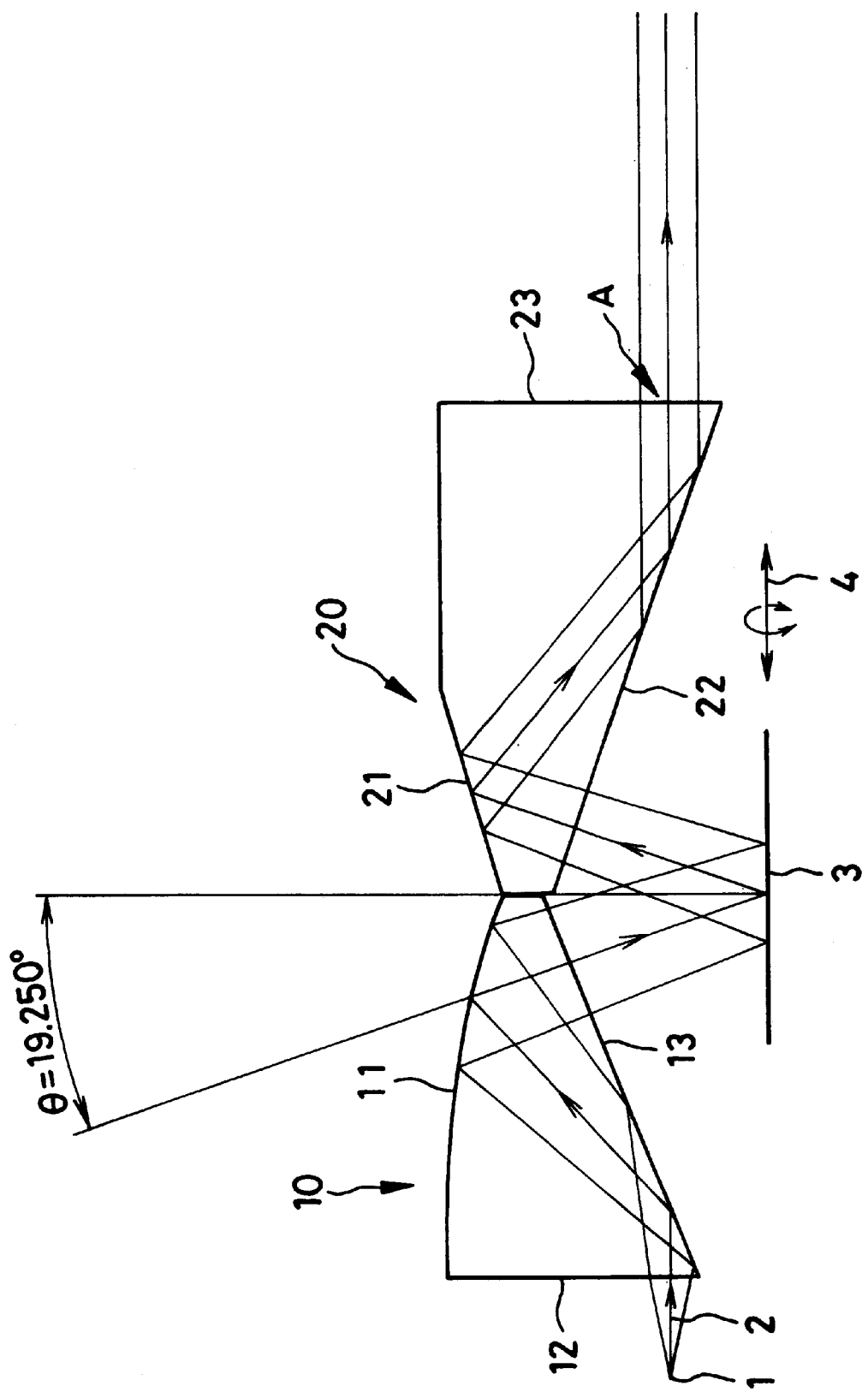
FIG. 3 is a sectional view showing the arrangement of a scanning optical system according to Example 3 of the present invention.

FIG. 3 is a sectional view showing the arrangement of a scanning optical system according to Example 3. In this example, the entrance-side reflecting optical system 10 and the exit-side reflecting optical system 20 are each formed from another type of decentered prism optical system. The axis 4 of rotation of the deflecting mirror 3 is set parallel to the axial principal ray 2 entering the reflecting optical system 10, which is on the entrance side of the deflecting mirror 3, from the light source 1 as in the case of the above.

In this embodiment, the decentered prism optical system 10, which constitutes the entrance-side reflecting optical system, is a prism having an entrance refracting surface 12, a reflecting surface 11, and an exit refracting surface 13. The decentered prism optical system 20, which constitutes the exit-side reflecting optical system 20, is also a prism having an entrance refracting surface 22, a reflecting surface 21, and an exit refracting surface 23. It should be noted, however, that the exit refracting surface 13 of the prism optical system 10 also serves as an internally totally reflecting surface, and the entrance refracting surface 22 of the prism optical system 20 also serves as an internally totally reflecting surface.

In the arrangement as shown in FIG. 3, a light beam from the light source 1 enters the entrance-side prism through the entrance refracting surface 12 of the decentered prism optical system 10, which constitutes the entrance-side reflecting optical system. The incident light beam is totally reflected by the reflecting surface 13, which also serves as a refracting surface. The reflected light beam is further reflected toward the deflecting mirror 3 by the curved reflecting surface 11. The reflected light beam exits from the prism through the refracting surface 13 also serving as a reflecting surface and is incident on the deflecting mirror 3 so that the incident angle of the axial principal ray 2 is θ. The light beam reflected by the deflecting mirror 3 enters the exit-side prism through the refracting surface 22 also serving as a reflecting surface of the decentered prism optical system 20, which constitutes the exit-side reflecting optical system. The incident light beam is reflected by the curved reflecting surface 21 and then totally reflected by the reflecting surface 22, which also serves as a refracting surface. The reflected light beam exits from the prism through the exit refracting surface 23 to travel in the Z-axis direction. Then, the light beam reaches a surface to be scanned at a finite position in the Z-axis direction and converges on the surface. With this arrangement, when the deflecting mirror 3 is oscillated about the axis 4 of rotation, which is parallel to the Z-axis, the light beam reflected and refracted by the exit-side reflecting optical system 20 scans the surface to be scanned in the X-axis direction.

Among the optical surfaces 11 to 13 and 21 to 23, which constitute the entrance-side reflecting optical system 10 and the exit-side reflecting optical system 20 of the present invention, the reflecting surfaces in particular are all decentered with respect to the axial principal ray 2 and have a power. Accordingly, aberrations due to decentration are produced by the reflecting surfaces. Therefore, it is desirable that at least one of the reflecting surfaces 11 and 13 and at least one of the reflecting surfaces 21 and 22 should be formed from rotationally asymmetric surfaces having no axis of rotational symmetry.

As a rotationally asymmetric surface having no axis of rotational symmetry, for example, a free-form surface can be used. A free-form surface is defined by the following equation. The Z-axis of the defining equation is the axis of the free-form surface.

$$Z = cr^2 / \left[1 + \sqrt{\{1 - (1+k)c^2 r^2\}}\right] + \sum_{j=2}^{66} C_j X^m Y^n \quad (a)$$

In Eq. (a), the first term is a spherical surface term, and the second term is a free-form surface term.

In the spherical surface term:
c: the curvature at the vertex
k: a conic constant
$r = \sqrt{(X^2 + Y^2)}$ The free-form surface term is given by $$\sum_{j=2}^{66} C_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \cdots$$

where $C_j$ (j is an integer of 2 or higher) are coefficients.

In general, the above-described free-form surface does not have planes of symmetry in both the XZ- and YZ-planes. However, a free-form surface having only one plane of symmetry parallel to the YZ-plane is obtained by making all terms of odd-numbered degrees with respect to X zero. A free-form surface having only one plane of symmetry parallel to the XZ-plane is obtained by making all terms of odd-numbered degrees with respect to Y zero.

The above-described free-form surface as a rotationally asymmetric surface having no axis of rotational symmetry may also be defined by Zernike polynomials. That is, the configuration of the free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), A is the distance from the Z-axis in the XY-plane, and R is the azimuth angle about the Z-axis, which is expressed by the angle of rotation measured from the Z-axis.

$$x = R \times \cos(A) \quad (b)$$
$$y = R \times \sin(A)$$
$$Z = D_2 + D_3 R \cos(A) + D_4 R \sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) + D_{18}(5R^5 - 4R^3)\cos(3A) +$$
$$D_{19}(10R^5 - 12R^3 + 3R)\cos(A) + D_{20}(10R^5 - 12R^3 + 3R)\sin(A) +$$
$$D_{21}(5R^5 - 4R^3)\sin(3A) + D_{22} R^5 \sin(5A) + D_{23} R^6 \cos(6A) +$$
$$D_{24}(6R^6 - 5R^4)\cos(4A) + D_{25}(15R^6 - 20R^4 + 6R^2)\cos(2A) +$$
$$D_{26}(20R^6 - 30R^4 + 12R^2 - 1) + D_{27}(15R^6 - 20R^4 + 6R^2)\sin(2A) +$$
$$D_{28}(6R^6 - 5R^4)\sin(4A) + D_{29} R^6 \sin(6A) \cdots$$

where $D_m$ (m is an integer of 2 or higher) are coefficients.

It should be noted that to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

It should be noted that the above defining equations are shown as merely examples of equations defining a rotationally asymmetric surface having no axis of rotational symmetry, and the same advantageous effect can be obtained for any other defining equation that expresses such a rotationally asymmetric surface. It is preferable that the rotationally asymmetric surface should be a rotationally asymmetric surface having no axis of rotational symmetry in the surface nor out of the surface. Such a rotationally asymmetric surface allows the degree of freedom to increase, and this is favorable for aberration correction.

It should be noted that in the arrangements as shown in FIGS. 1 to 3, the entire optical system can be arranged in plane symmetry with respect to the YZ-plane. Therefore, it is desirable that the rotationally asymmetric curved reflecting surfaces 11, 21, etc. should be formed from free-form surfaces having a plane of symmetry parallel to the YZ-plane. It is more desirable to form the rotationally asymmetric curved reflecting surfaces 11, 21, etc. from rotationally asymmetric free-form surfaces having only one plane of symmetry parallel to the YZ-plane.

Regarding the incident angle θ at which the axial principal ray 2 is incident on the deflecting mirror 3, it is desirable to satisfy the following condition:

$$0° < \theta < 60° \quad (1)$$

If the angle θ is not smaller than the upper limit of the condition (1), i.e. 60°, it becomes impossible to effectively deflect the light beam for scanning by the scanning optical system according to the present invention.

It is more desirable to satisfy the following condition:

$$5° < \theta < 45° \quad (1\text{-}1)$$

If the angle θ is not larger than the lower limit of the condition (1-1), i.e. 5°, it is not easy to separate the light beam incident on the deflecting mirror 3 and the light beam reflected from the deflecting mirror 3 from each other so that the reflected light beam enters the exit-side reflecting optical system 20 smoothly.

It is even more desirable to satisfy the following condition:

$$10°<\theta<35° \qquad (1\text{-}2)$$

Incidentally, in the scanning optical system according to the present invention, either a galvanometer mirror or a polygon mirror may be used as the deflecting mirror 3. When a galvanometer mirror is used, it is desirable for the scanning optical system to satisfy the condition for f·arcsinθ characteristics. When a polygon mirror is used, it is desirable to satisfy the condition for f·θ characteristics. In either case, the scanning optical system can be arranged so as to satisfy the condition for f·arcsinθ characteristics or the condition for f·θ characteristics by using the above-described free-form surfaces as the optical surfaces 11 to 13 and 21 to 23, which constitute the entrance-side reflecting optical system 10 and the exit-side reflecting optical system 20, and appropriately selecting the coefficients of the free-form surfaces.

Incidentally, as will be clear from numerical examples (shown later), when the entrance-side reflecting optical system 10 and the exit-side reflecting optical system 20 are formed from decentered prisms in each of which there is at least one internal reflection, as shown in FIG. 2 or 3, it is possible to improve the linearity of the scanning light beam that exits from the exit-side reflecting optical system 20 in the Z-axis direction and scans the surface to be scanned in the X-axis direction.

When the scanning range in the X-axis direction of the scanning light beam on the surface to be scanned is denoted by $2X_0$ and the maximum displacement in the Y-axis direction of the scanning light beam on the surface to be scanned is denoted by $\Delta Y$, it is desirable to satisfy the following condition:

$$\Delta Y < 2X_0/100 \qquad (2)$$

If the condition (2) is satisfied, it is possible to effect scanning of extremely good linearity and hence possible to use the scanning optical system according to the present invention as a scanning optical system for accurate information reading or information recording.

It is more desirable to satisfy the following condition:

$$\Delta Y < 2X_0/300 \qquad (2\text{-}1)$$

With the arrangement shown in FIG. 3, in particular, as will be clear from the numerical example (shown later), an image of the light source 1 that is satisfactorily corrected for aberrations can be formed over the entire scanning range on the surface to be scanned (image plane).

Thus, it is possible to effect even more accurate information reading or information recording.

Numerical examples of Examples 1 to 3 shown in FIGS. 1 to 3 will be shown below. Constituent parameters of Examples 1 to 3 will be shown later. In the constituent parameters, surface Nos. are shown as surface Nos. in forward ray tracing from the light source 1 (object) through the deflecting mirror 3 (stop) to the surface to be scanned (image plane). Regarding the definition of coordinates, as shown in FIG. 1, an axial principal ray 2 is defined by a light ray emanating from the center of the light source 1 and passing through the center of the deflecting mirror 3 that constitutes the stop. A reference plane (a hypothetic plane in the case of FIG. 1; the entrance refracting surface 12 in the case of FIGS. 2 and 3) perpendicular to the axial principal ray 2 is set on the entrance side of the reflecting optical system 10. The intersection between the reference plane and the axial principal ray 2 is defined as the origin of a decentered optical surface. The direction along the axial principal ray 2 is defined as a positive direction of a Z-axis. A plane containing the axial principal ray 2 incident on the reflecting optical system 10 and the axial principal ray 2 exiting from the reflecting optical system 10 is defined as a YZ-plane. An axis passing through the origin and perpendicularly intersecting the YZ-plane is defined as an X-axis. The direction in which the X-axis extends from the obverse side to the reverse side of the plane of the figure is defined as a positive direction of the X-axis. An axis that constitutes a right-handed orthogonal coordinate system in combination with the X- and Z-axes is defined as a Y-axis.

In the constituent parameters (shown later), each decentered surface is given displacements in the X-, Y- and Z-axis directions (X, Y and Z, respectively) of the vertex position of the surface from the origin of the coordinate system determined with respect to the center of the reference plane, and tilt angles (degrees) of the center axis of the surface [the Z-axis of the above equation (a) in regard to free-form surfaces] with respect to the X-, Y- and Z-axes (α, β and γ, respectively). In this case, the positive α and β mean counterclockwise rotation relative to the positive directions of the corresponding axes, and the positive γ means clockwise rotation relative to the positive direction of the Z-axis.

It should be noted that the position of the image plane as the surface to be scanned is expressed by the amount of displacement from the intersection A between the final optical surface of the exit-side reflecting optical system 20 (the curved reflecting surface 21 in the case of FIG. 1; the exit refracting surface 23 in the case of FIGS. 2 and 3) and the axial principal ray 2 when the deflecting mirror 3 is at a neutral position.

Among the optical surfaces constituting the optical system in each example, a specific surface (including a hypothetic plane) and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

In the constituent parameters (shown later), those terms concerning free-form surfaces for which no data is shown are zero. The refractive index is expressed by the refractive index for the spectral d-line (wavelength: 587.56 nanometers). Lengths are given in millimeters.

Other free-form surface defining equations include Zernike polynomials given by the above-described equation (b).

Other examples of surfaces usable in the present invention are expressed by the following defining equation (d):

$$Z = \Sigma\Sigma C_{nm} XY$$

Assuming that k=7 (polynomial of degree 7), for example, a free-form surface is expressed by an expanded form of the above equation as follows:

$$Z = C_2 + C_3 y + C_4 |x| + C_5 y^2 + C_6 y|x| + C_7 x^2 + C_8 y^3 + \qquad (d)$$
$$C_9 y^2 |x| + C_{10} yx^2 + C_{11}|x^3| + C_{12} y^4 + C_{13} y^3 |x| + C_{14} y^2 x^2 +$$
$$C_{15} y|x^3| + C_{16} x^4 + C_{17} y^5 + C_{18} y^4 |x| + C_{19} y^3 x^2 + C_{20} y^2 |x^3| +$$
$$C_{21} yx^4 + C_{22}|x^5| + C_{23} y^6 + C_{24} y^5 |x| + C_{25} y^4 x^2 + C_{26} y^3 |x^3| +$$
$$C_{27} y^2 x^4 + C_{28} y|x^5| + C_{29} x^6 + C_{30} y^7 + C_{31} y^6 |x| + C_{32} y^5 x^2 +$$
$$C_{33} y^4 |x^3| + C_{34} y^3 x^4 + C_{35} y^2 |x^5| + C_{36} yx^6 + C_{37}|x^7|$$

Although in the examples of the present invention the surface configuration is expressed by a free-form surface using the above equation (a), it should be noted that the same advantageous effect can be obtained by using the above equation (b) or (d), as a matter of course.

It should be noted that in each example, the NA (numerical aperture) on the light source 1 side is 0.1, and the angle of rotation of the deflecting mirror 3 is ±15°.

Constituent parameters of the above-described Examples 1 to 3 are as follows. In the tables below: "FFS" denotes a free-form surface; "RP" denotes a reference plane; and "DM" denotes a deflecting mirror.

EXAMPLE 1

| Surface No. | Radius of curvature | Surface separaton | Displacement and tilt | Refractive index | Abbe's No. |
|---|---|---|---|---|---|
| Object plane | ∞ | 1.00 | | | |
| 1 | ∞ (RP) | | | | |
| 2 | FFS① | | (1) | | |
| 3 | ∞ (Stop) (DM) | | (2) | | |
| 4 | FFS② | | (3) | | |
| Image plane | ∞ | | (4) | | |

| | FFS① | | |
|---|---|---|---|
| $C_4$ | $-3.7896 \times 10^{-1}$ | $C_6$ | $-6.9904 \times 10^{-2}$ |
| | FFS② | | |
| $C_4$ | $-2.0330 \times 10^{-2}$ | $C_6$ | $1.7291 \times 10^{-2}$ |

| | | Displacement and tilt(1) | | | |
|---|---|---|---|---|---|
| X | 0.00 | Y | 0.00 | Z | 0.32 |
| α | 58.25 | β | 0.00 | γ | 0.00 |
| | | Displacement and tilt(2) | | | |
| X | 0.00 | Y | −2.00 | Z | 1.32 |
| α | 90.00 | β | 0.00 | γ | 0.00 |
| | | Displacement and tilt(3) | | | |
| X | 0.00 | Y | 0.00 | Z | 2.32 |
| α | 121.75 | β | 0.00 | γ | 0.00 |
| | | Displacement and tilt(4) | | | |
| X | 0.00 | Y | 0.00 | Z | 113.00 |
| α | 0.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | 1.00 | | | |
| 1 | 2.35 (RP) | | | 1.5254 | 55.8 |
| 2 | FFS① | | (1) | 1.5254 | 55.8 |
| 3 | FFS② | | (2) | | |
| 4 | ∞ (Stop) (DM) | | (3) | | |
| 5 | FFS③ | | (4) | 1.5254 | 55.8 |
| 6 | FFS④ | | (5) | 1.5254 | 55.8 |
| 7 | 60.37 | | (6) | | |
| Image plane | ∞ | | (7) | | |

| | FFS① | | |
|---|---|---|---|
| $C_4$ | $-2.1996 \times 10^{-1}$ | $C_6$ | $-6.4635 \times 10^{-2}$ | $C_8$ | $-8.7604 \times 10^{-4}$ |
| $C_{10}$ | $2.5364 \times 10^{-4}$ | | | | |
| | FFS② | | | | |
| $C_4$ | $-4.5230 \times 10^{-1}$ | $C_6$ | $-3.7634 \times 10^{-1}$ | $C_8$ | $-4.1040 \times 10^{-2}$ |
| $C_{10}$ | $-3.8502 \times 10^{-2}$ | | | | |
| | FFS③ | | | | |
| $C_4$ | $-1.0053 \times 10^{-1}$ | $C_6$ | $-1.0318 \times 10^{-1}$ | $C_8$ | $1.7444 \times 10^{-2}$ |
| $C_{10}$ | $6.4528 \times 10^{-3}$ | | | | |
| | FFS④ | | | | |
| $C_4$ | $-3.7869 \times 10^{-2}$ | $C_6$ | $-3.1252 \times 10^{-3}$ | $C_8$ | $-2.1026 \times 10^{-3}$ |
| $C_{10}$ | $-1.3598 \times 10^{-3}$ | | | | |

| | | Displacement and tilt(1) | | | |
|---|---|---|---|---|---|
| X | 0.00 | Y | −0.00 | Z | 2.30 |
| α | 57.74 | β | 0.00 | γ | 0.00 |
| | | Displacement and tilt(2) | | | |
| X | 0.00 | Y | −1.05 | Z | 2.80 |
| α | 101.67 | β | 0.00 | γ | 0.00 |
| | | Displacement and tilt(3) | | | |
| X | 0.00 | Y | −2.00 | Z | 3.42 |
| α | 90.00 | β | −15.00 | γ | 0.00 |
| | | Displacement and tilt(4) | | | |
| X | 0.00 | Y | −1.03 | Z | 4.05 |
| α | 87.07 | β | 0.00 | γ | 0.00 |
| | | Displacement and tilt(5) | | | |
| Z | 0.00 | Y | 0.00 | Z | 4.46 |
| α | 123.94 | β | 0.00 | γ | 0.00 |
| | | Displacement and tilt(6) | | | |
| X | 0.00 | Y | 0.00 | Z | 5.20 |
| α | 0.00 | β | 0.00 | γ | 0.00 |
| | | Displacement and tilt(7) | | | |
| X | 0.00 | Y | 0.00 | Z | 113.00 |
| α | 0.00 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | 1.00 | | | |
| 1 | 75.72 (RP) | | (1) | 1.5254 | 55.8 |
| 2 | FFS① | | (1) | 1.5254 | 55.8 |
| 3 | FFS② | | (2) | 1.5254 | 55.8 |
| 4 | FFS① | | (1) | | |
| 5 | ∞(Stop) (DM) | | (3) | | |
| 6 | FFS③ | | (4) | 1.5254 | 55.8 |
| 7 | FFS④ | | (5) | 1.5254 | 55.8 |
| 8 | FFS③ | | (4) | 1.5254 | 55.8 |

-continued

| Surface No. | Radius of curvature | Surface separation | Displacement and tilt | Refractive index | Abbe's No. |
|---|---|---|---|---|---|
| 9 | ∞ | | (6) | | |
| Image plane | ∞ | | (7) | | |

FFS①

| | | | | | |
|---|---|---|---|---|---|
| $C_4$ | $-2.4198 \times 10^{-1}$ | $C_6$ | $-7.0455 \times 10^{-3}$ | $C_8$ | $5.0522 \times 10^{-2}$ |
| $C_{10}$ | $8.7047 \times 10^{-4}$ | | | | |

FFS②

| | | | | | |
|---|---|---|---|---|---|
| $C_4$ | $1.1028 \times 10^{-2}$ | $C_6$ | $4.7748 \times 10^{-2}$ | $C_8$ | $1.3967 \times 10^{-2}$ |
| $C_{10}$ | $-2.4794 \times 10^{-3}$ | | | | |

FFS③

| | | | | | |
|---|---|---|---|---|---|
| $C_4$ | $2.4381 \times 10^{-2}$ | $C_6$ | $-3.7603 \times 10^{-3}$ | $C_8$ | $2.0867 \times 10^{-3}$ |
| $C_{10}$ | $3.0249 \times 10^{-4}$ | | | | |

FFS④

| | | | | | |
|---|---|---|---|---|---|
| $C_4$ | $2.9358 \times 10^{-2}$ | $C_6$ | $1.1433 \times 10^{-2}$ | $C_8$ | $4.2206 \times 10^{-3}$ |

Displacement and tilt(1)

| X | 0.00 | Y | 0.00 | Z | 0.69 |
|---|---|---|---|---|---|
| α | −68.84 | β | 0.00 | γ | 0.00 |

Displacement and tilt(2)

| X | 0.00 | Y | 2.00 | Z | 2.88 |
|---|---|---|---|---|---|
| α | −103.70 | β | 0.00 | γ | 0.00 |

Displacement and tilt(3)

| X | 0.00 | Y | −1.00 | Z | 3.95 |
|---|---|---|---|---|---|
| α | −90.00 | β | −15.00 | γ | 0.00 |

Displacement and tilt(4)

| X | 0.00 | Y | −0.01 | Z | 7.52 |
|---|---|---|---|---|---|
| α | 70.71 | β | 0.00 | γ | 0.00 |

Displacement and tilt(5)

| X | 0.00 | Y | 2.00 | Z | 5.00 |
|---|---|---|---|---|---|
| α | 106.25 | β | 0.00 | γ | 0.00 |

Displacement and tilt(6)

| X | 0.00 | Y | 0.00 | Z | 9.00 |
|---|---|---|---|---|---|
| α | 0.00 | β | 0.00 | γ | 0.00 |

Displacement and tilt(7)

| X | 0.00 | Y | 0.00 | Z | 113.00 |
|---|---|---|---|---|---|
| α | 0.00 | β | 0.00 | γ | 0.00 |

Figure 4:
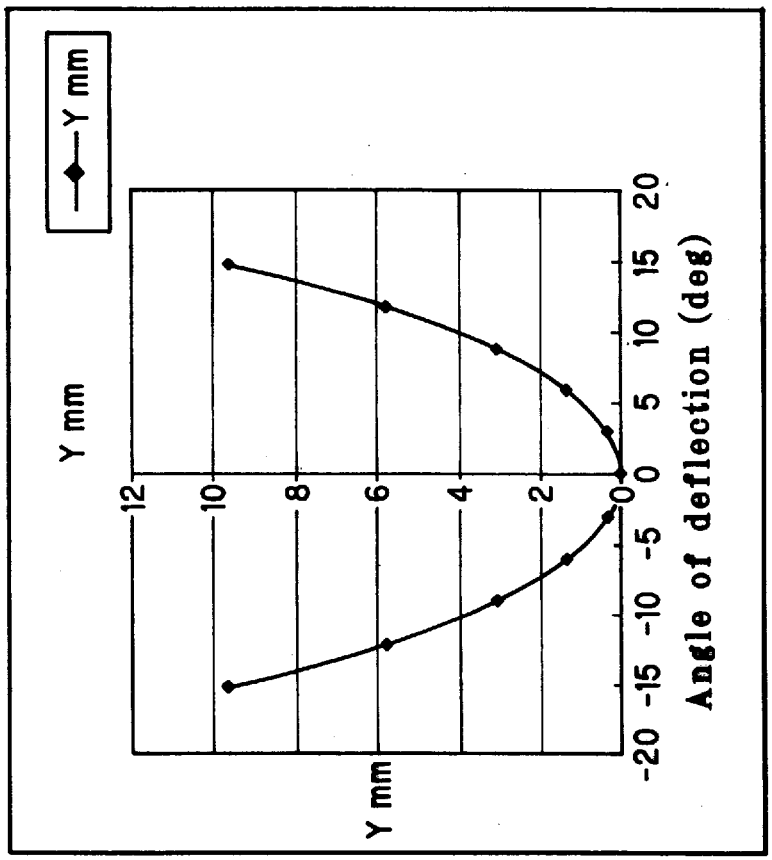
FIG. 4 is a diagram showing the relationship between the angle of deflection of a deflecting mirror and the position in X-axis direction (a) and position in Y-axis direction (b) of a scanning light beam on a surface to be scanned in Example 1.
Figure 4:
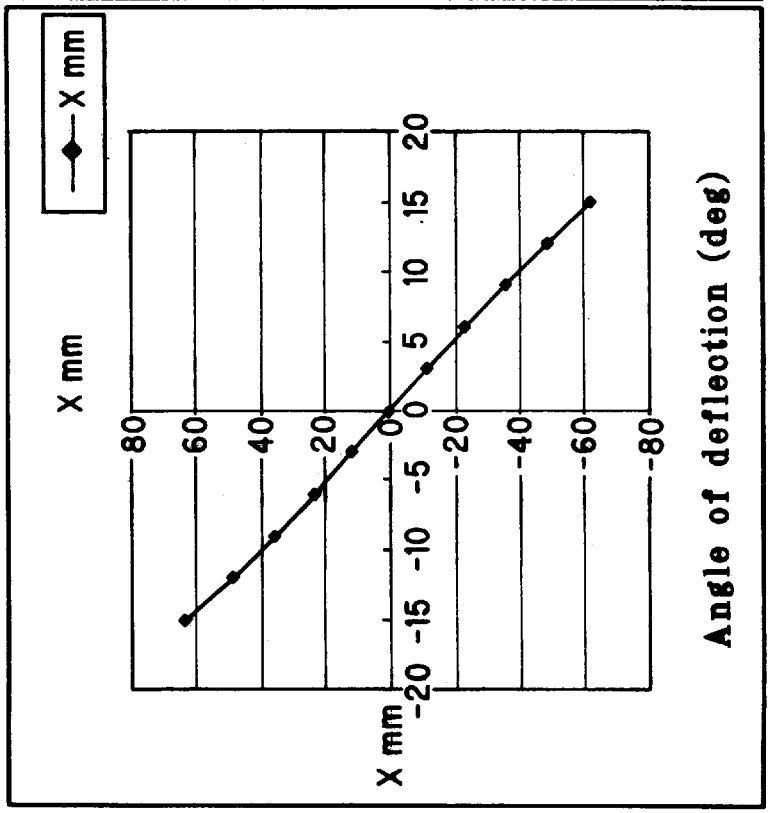
Figure 5:
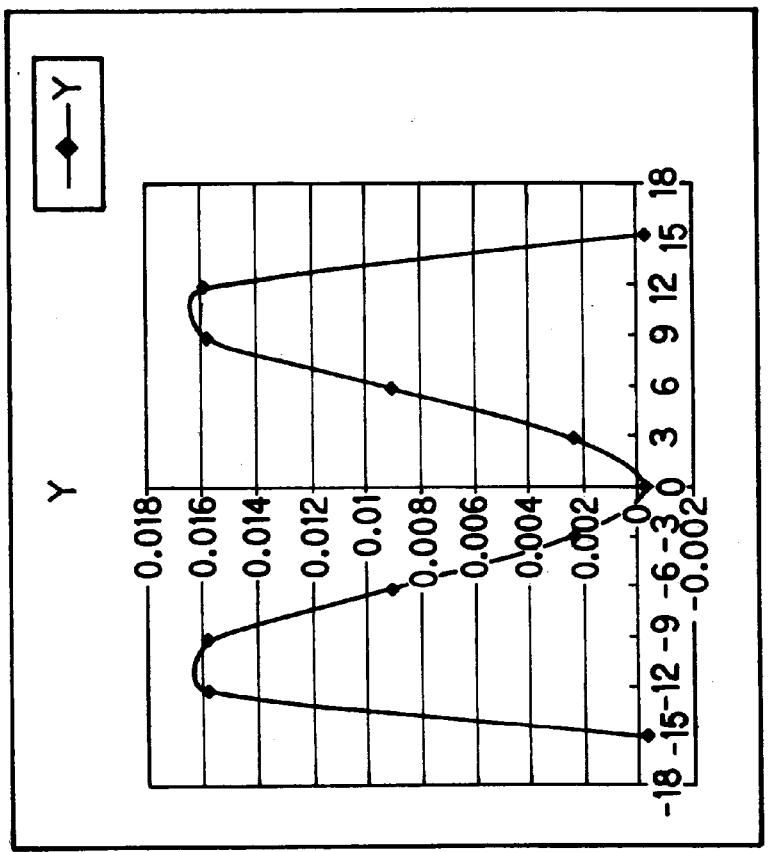
FIG. 5 is a diagram showing the relationship between the angle of deflection of a deflecting mirror and the position in X-axis direction (a) and position in Y-axis direction (b) of a scanning light beam on a surface to be scanned in Example 2.
Figure 5:
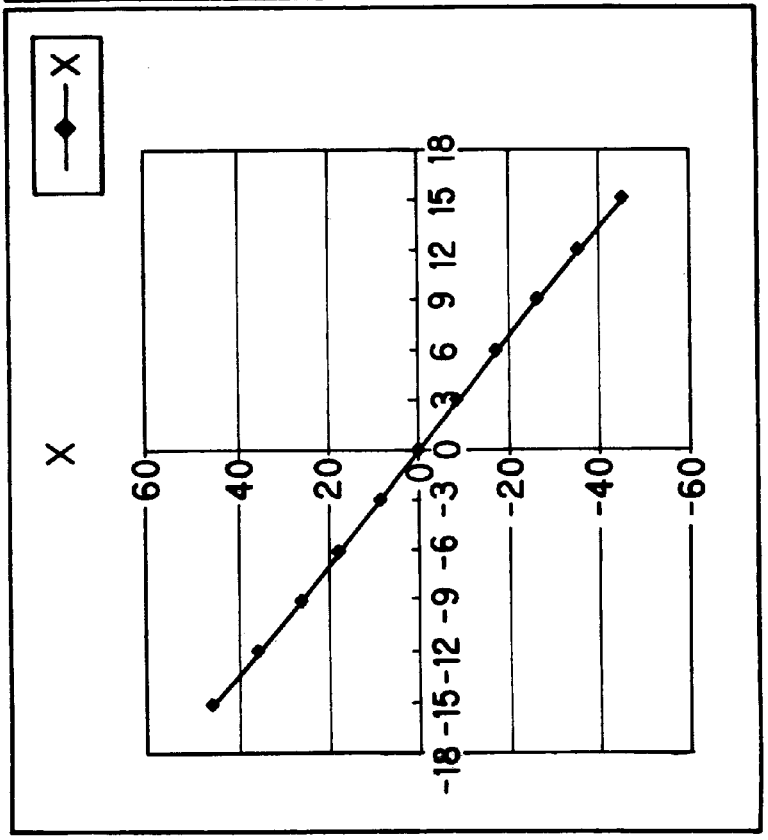
Figure 6:
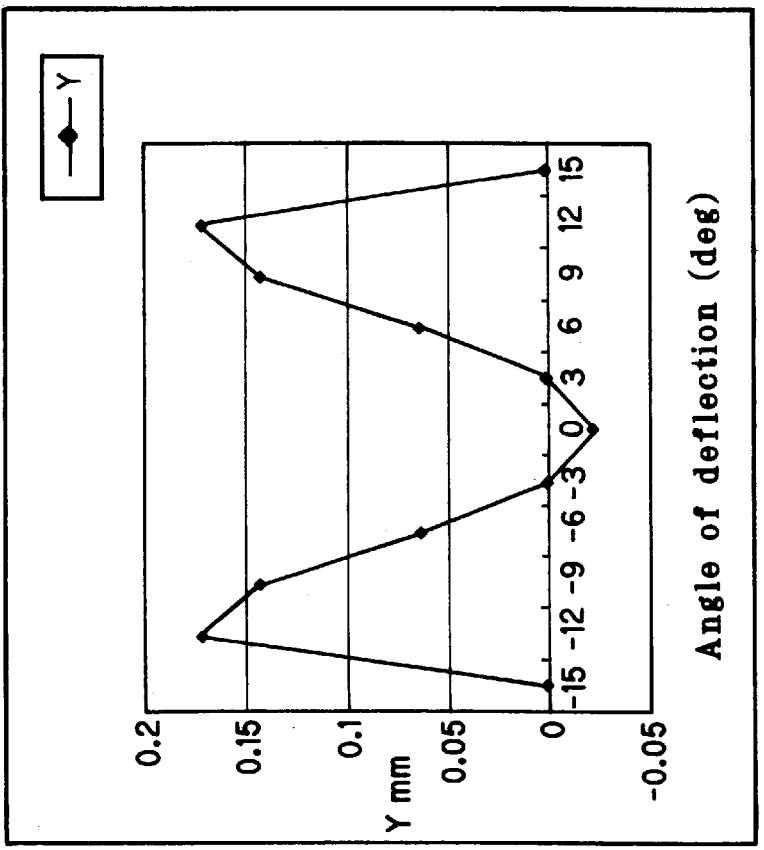
FIG. 6 is a diagram showing the relationship between the angle of deflection of a deflecting mirror and the position in X-axis direction (a) and position in Y-axis direction (b) of a scanning light beam on a surface to be scanned in Example 3.
Figure 6:
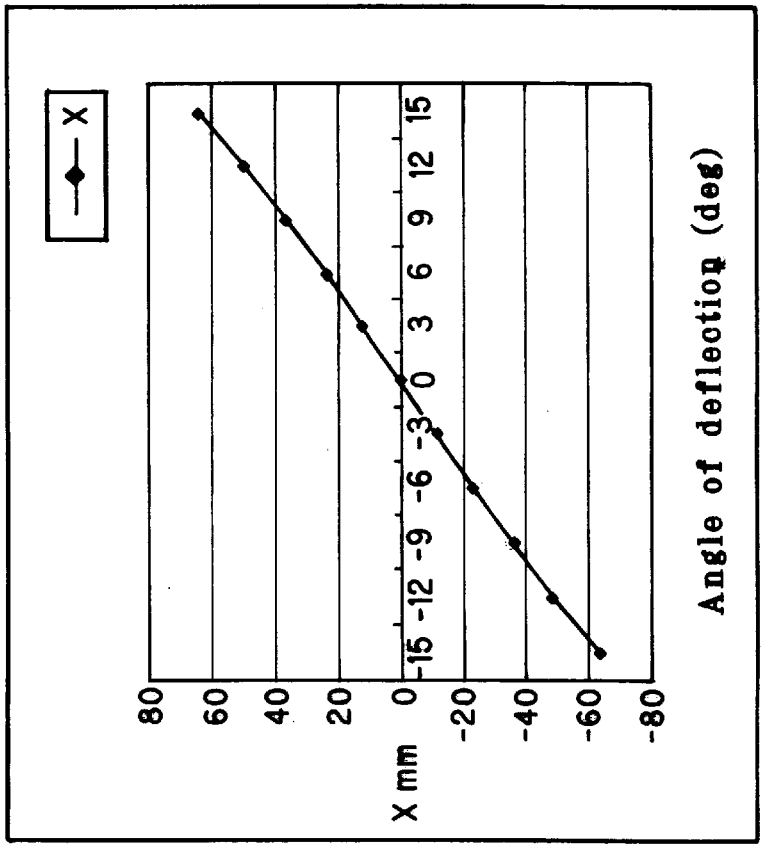

FIGS. 4 to 6 show the relationship between the angle of deflection of the deflecting mirror 3 and the position in X-axis direction (a) and position in Y-axis direction (b) of the scanning light beam on the surface to be scanned in Examples 1 to 3, respectively.

Figure 7:
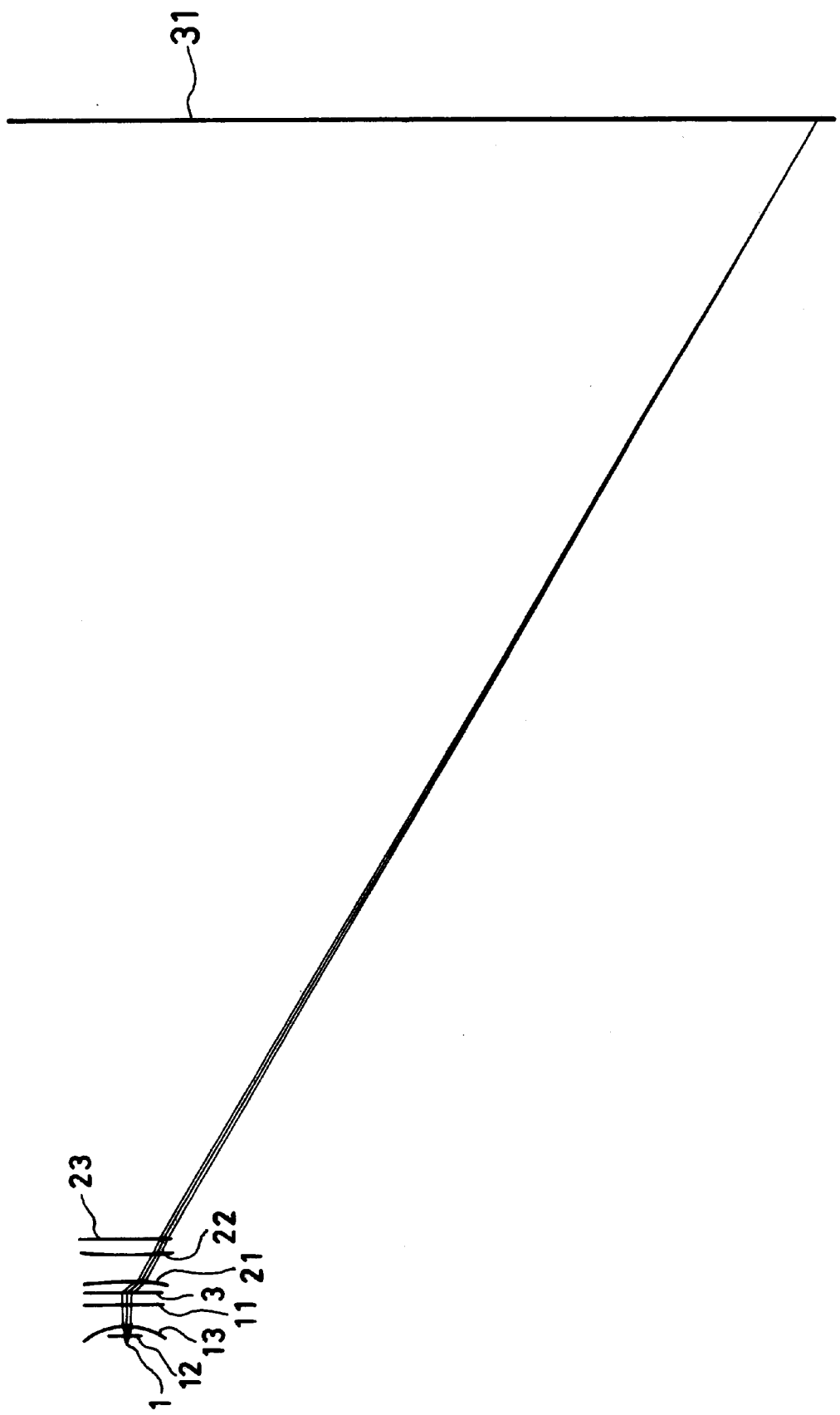
FIG. 7 is a ray path diagram illustrating rays projected onto the XY-plane at the right end of the scanning range in Example 3.
Figure 8:
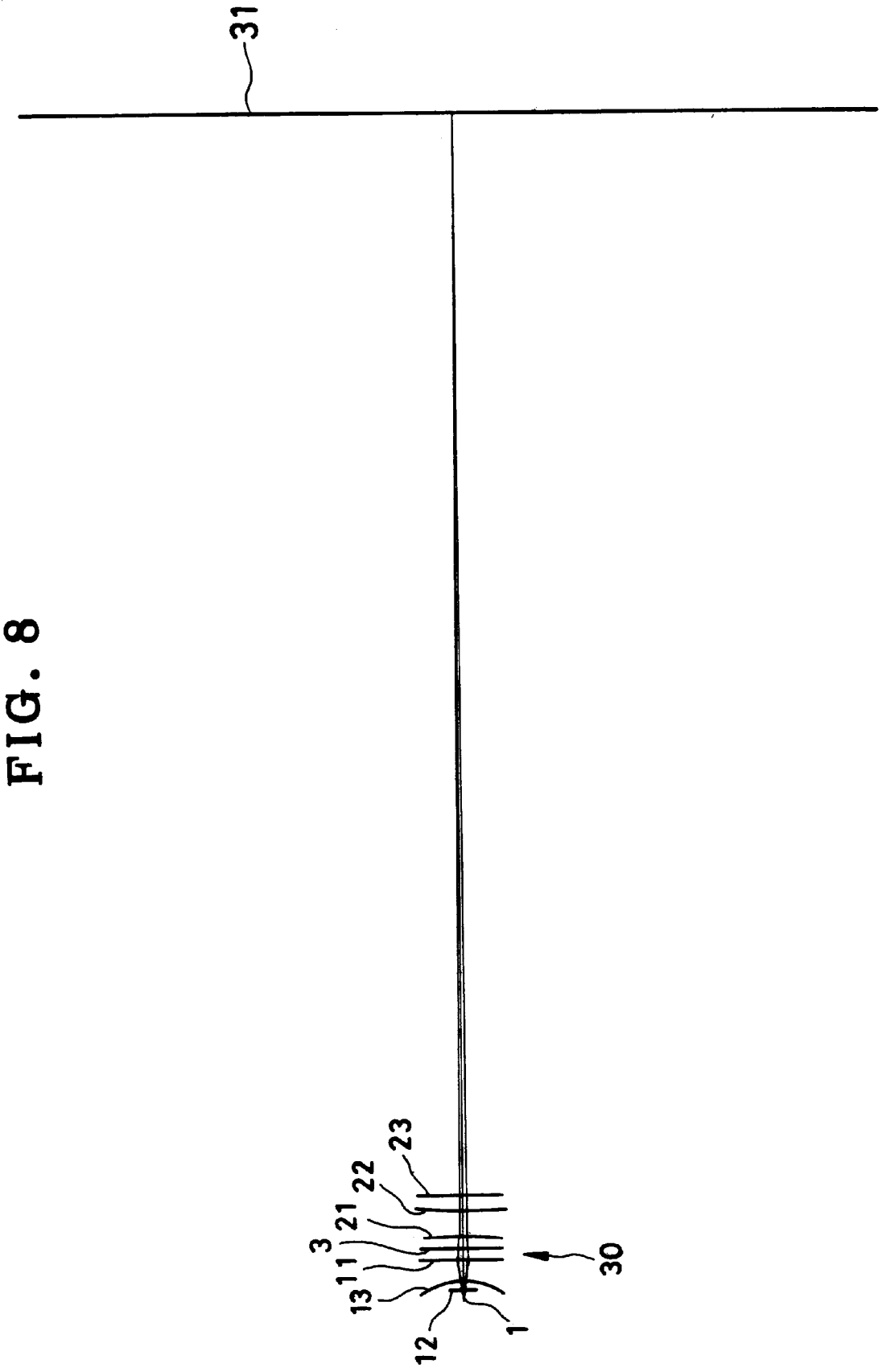
FIG. 8 is a ray path diagram illustrating rays projected onto the XY-plane at the center of the scanning range in Example 3.
Figure 9:
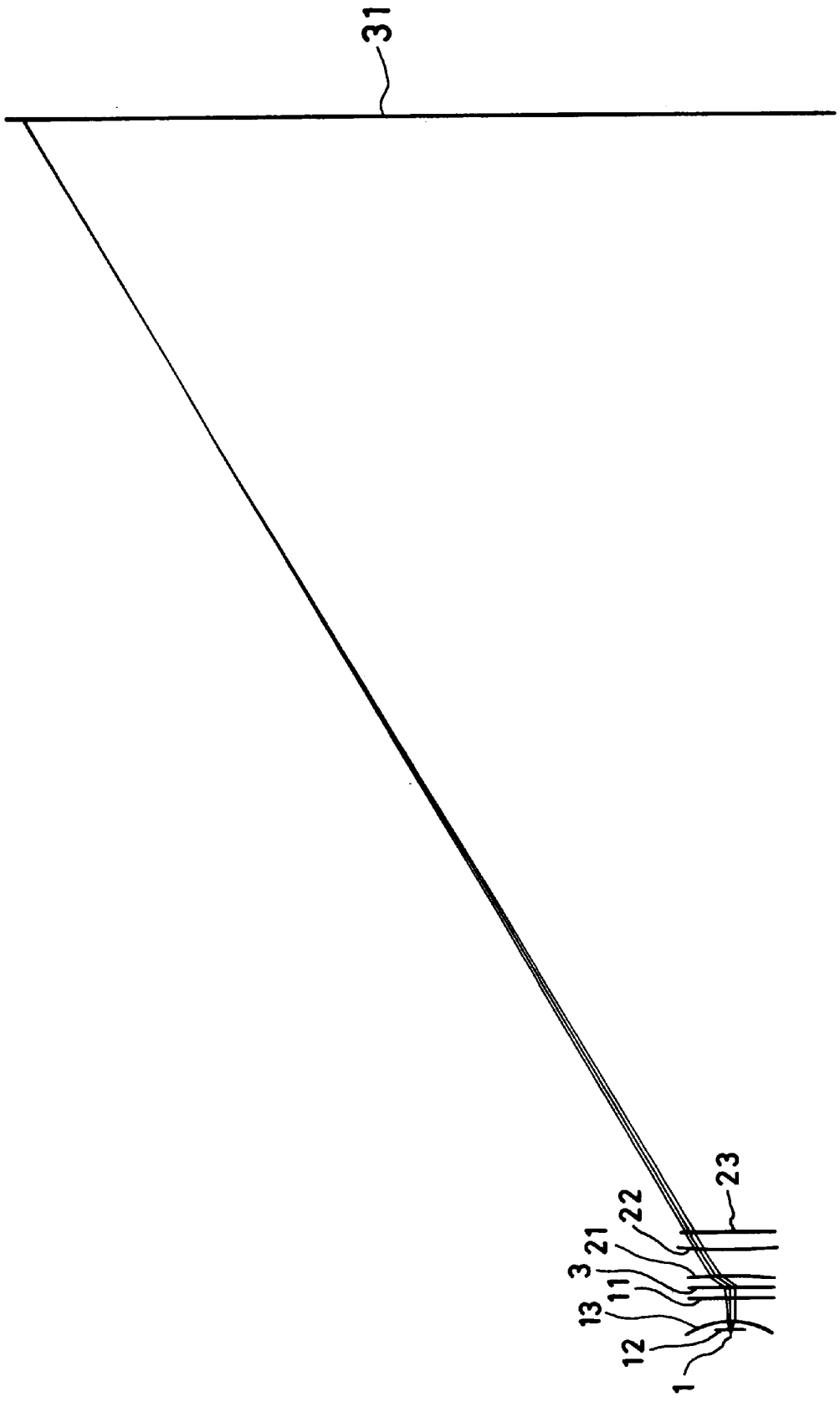
FIG. 9 is a ray path diagram illustrating rays projected onto the XY-plane at the left end of the scanning range in Example 3.
Figure 10:
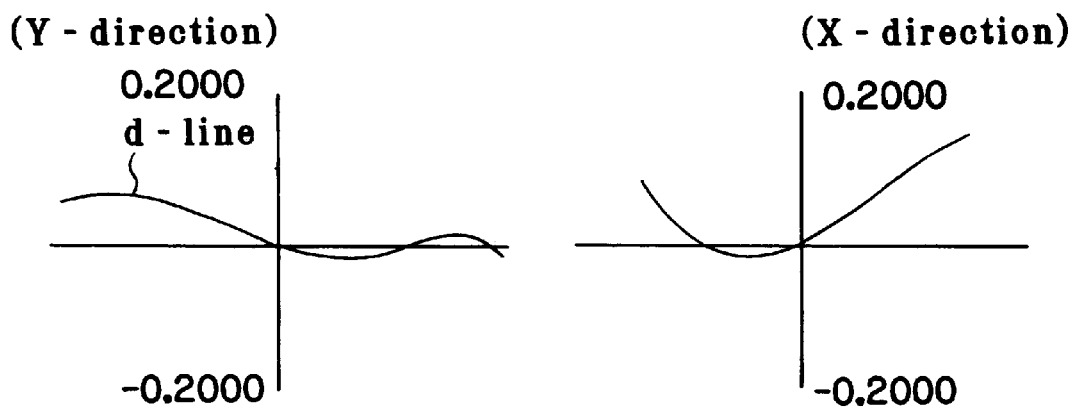
FIG. 10 is a diagram showing lateral aberrations on a surface being scanned in the case of FIGS. 7 to 9 in Example 3.
Figure 10:
Figure 10:
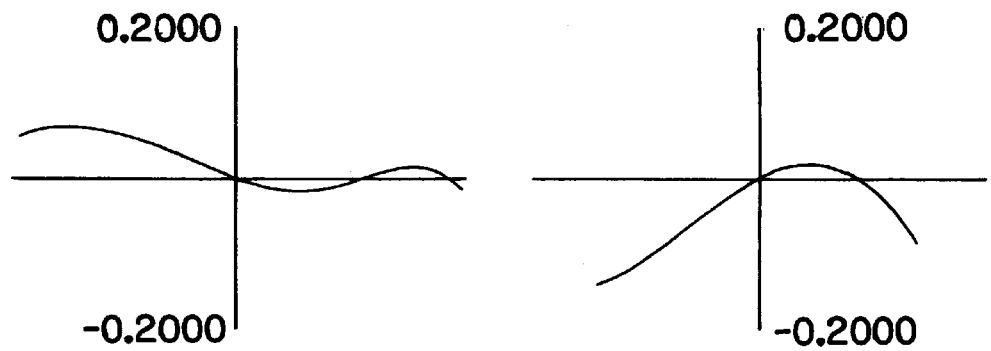

FIGS. 7 to 9 are ray path diagrams illustrating rays projected onto the XY-plane at the right end, center and left end of the scanning range in Example 3, shown in FIG. 3, as a typical example. In these figures, the scanning optical system according to Example 3 is denoted by reference numeral 30, and the surface to be scanned is denoted by reference numeral 31. Parts (a) to (c) of FIG. 10 show lateral aberrations on the surface being scanned in the case of FIGS. 7 to 9, respectively.

It should be noted that the values for the incident angle θ at which the axial principal ray 2 is incident on the deflecting mirror 3 in Examples 1 to 3 are as follows:

| Example | θ |
|---|---|
| 1 | 26.497° |
| 2 | 33.029° |
| 3 | 19.250° |

Figure 11:
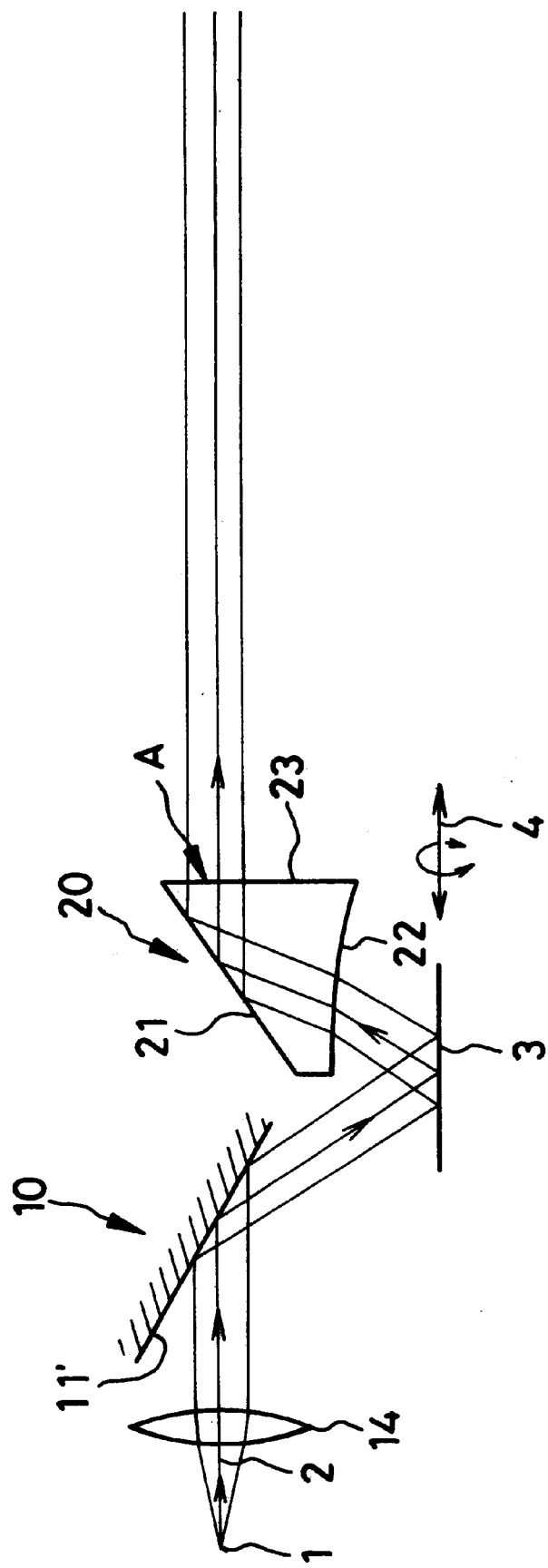
FIG. 11 is a sectional view showing the arrangement of a scanning optical system according to another example of the present invention.

As an example different from the foregoing examples, the scanning optical system may be arranged as shown in FIG. 11 (a description of constituent parameters thereof is omitted). The scanning optical system according to this example includes a light source 1, a deflecting mirror 3, a reflecting optical system 10 on the entrance side of the deflecting mirror 3, and a reflecting optical system 20 on the exit side of the deflecting mirror 3. When an axial principal ray 2 is defined by a light ray emanating from the light source 1 and passing through the center of the deflecting mirror 3 that constitutes a stop of the optical system, the axis 4 of rotation of the deflecting mirror 3 is set parallel to the axial principal ray 2 entering the reflecting optical system 10, which is on the entrance side of the deflecting mirror 3, from the light source 1. In this example, the entrance-side reflecting optical system 10 includes a positive lens 14 placed closer to the light source 1 and an aluminum-coated plane mirror 11' placed on the exit side of the positive lens 14. The exit-side reflecting optical system 20 is a prism having an entrance refracting surface 22, a reflecting surface 21, and an exit refracting surface 23 as in the case of Example 2.

In this arrangement, a light beam from the light source 1 is formed into a parallel beam through the positive lens 14 of the reflecting optical system 10. Then, the light beam is reflected toward the deflecting mirror 3 by the plane mirror 11' and incident on the deflecting mirror 3 so that the incident angle of the axial principal ray 2 is θ. The light beam reflected by the deflecting mirror 3 enters the prism through the entrance refracting surface 22 of the decentered prism optical system 20, which constitutes the exit-side reflecting optical system 20. The incident light beam is reflected to travel in the Z-axis direction by the curved reflecting surface 21. The reflected light beam exits from the prism through the exit refracting surface 23 and travels in the Z-axis direction. Then, the light beam reaches a surface to be scanned at a finite position in the Z-axis direction and converges on the surface. With this arrangement, when the deflecting mirror 3 is oscillated about the axis 4 of rotation, which is parallel to the Z-axis, the light beam reflected and refracted by the exit-side reflecting optical system 20 scans the surface to be scanned in the X-axis direction.

It should be noted that decentered prism optical systems usable as the entrance-side reflecting optical system 10 and the exit-side reflecting optical system 20 in the present invention are not necessarily limited to the types shown in FIGS. 2, 3 and 11, but various known types of decentered prism optical systems are usable.

As will be clear from the foregoing description, according to the present invention, the axis of rotation of the deflecting mirror is set approximately parallel to the axial principal ray entering the entrance-side reflecting optical system from the light source. Therefore, the scanning optical system can be constructed in a compact form. The scanning optical system can be constructed in an even more compact form by arranging the scanning optical system so that the axial principal ray entering the entrance-side reflecting optical system from the light source and the axial principal ray exiting from the exit-side reflecting optical system are approximately parallel to each other. Therefore, the scanning optical system according to the present invention can be used for various purposes, e.g. information reading, information recording, and measurement.

What is claimed is:

1. A scanning optical system comprising:
   an entrance-side reflecting optical system on which light beam from a light source is incident;
   a deflecting mirror for reflecting and deflecting the light beam exiting from said entrance-side reflecting optical system; and
   an exit-side reflecting optical system on which the light beam reflected from said deflecting mirror is incident;
   wherein when an axial principal ray is defined by a light ray emanating from said light source and passing through a center of said deflecting mirror that constitutes a stop of the optical system, an axis of rotation of said deflecting mirror is set approximately parallel to the axial principal ray entering said entrance-side reflecting optical system from said light source.

2. A scanning optical system according to claim 1, wherein the axial principal ray entering said entrance-side reflecting optical system from said light source and the axial principal ray exiting from said exit-side reflecting optical system are approximately parallel to each other at some position in a range of rotation of said deflecting mirror.

3. A scanning optical system according to claim 1 or 2, wherein said deflecting mirror is a galvanometer mirror.

4. A scanning optical system according to claim 1 or 2, wherein said deflecting mirror is a polygon mirror.

5. A scanning optical system according to claim 1 or 2, wherein the deflected light beam exiting from said exit-side reflecting optical system converges on a surface to be scanned.

6. A scanning optical system according to claim 1 or 2, wherein said entrance-side reflecting optical system has at least one positive lens and a reflecting surface.

7. A scanning optical system according to claim 6, wherein said reflecting surface is formed from a plane mirror.

8. A scanning optical system according to claim 1 or 2, wherein said entrance-side reflecting optical system and said exit-side reflecting optical system each comprise a decentered reflecting surface that is a rotationally asymmetric surface having one or two planes of symmetry.

9. A scanning optical system according to claim 1 to 2, wherein said entrance-side reflecting optical system and said exit-side reflecting optical system each have at least one decentered reflecting surface that is a rotationally asymmetric surface having one or two planes of symmetry.

10. A scanning optical system according to claim 9, wherein said entrance-side reflecting optical system comprises a decentered prism,
    said decentered prism having:
        an entrance refracting surface;
        an internally reflecting surface; and
        an exit refracting surface.

11. A scanning optical system according to claim 9, wherein said entrance-side reflecting optical system comprises a decentered prism,
    said decentered prism having:
        an entrance refracting surface;
        an internally reflecting surface; and
        an exit refracting surface also serving as an internally totally reflecting surface.

12. A scanning optical system according to claim 9, wherein said exit-side reflecting optical system comprises a decentered prism,
    said decentered prism having:
        an entrance refracting surface;
        an internally reflecting surface; and
        an exit refracting surface.

13. A scanning optical system according to claim 9, wherein said exit-side reflecting optical system comprises a decentered prism,
    said decentered prism having:
        an entrance refracting surface also serving as an internally totally reflecting surface;
        an internally reflecting surface; and
        an exit refracting surface.

14. A scanning optical system according to claim 10, wherein when a direction of the axial principal ray entering said entrance-side reflecting optical system from said light source is defined as a Z-axis direction, and a plane containing the axial principal ray entering said entrance-side reflecting optical system and the axial principal ray exiting from said entrance-side reflecting optical system is defined as a YZ-plane, and further a direction perpendicularly intersecting the YZ-plane is defined as an X-axis direction, the following condition is satisfied:

$$\Delta Y < 2X_0/100 \qquad (2)$$

where $2X_0$ is a scanning range in the X-axis direction of a scanning light beam on a surface to be scanned, and $\Delta Y$ is a maximum displacement in the Y-axis direction of the scanning light beam on the surface to be scanned.

15. A scanning optical system according to claim 1 or 2, wherein a minimum value $\theta$ of an incident angle at which said axial principal ray is incident on said deflecting mirror satisfies the following condition:

$$0° < \theta < 60° \qquad (1).$$

* * * * *